(No Model.)
2 Sheets—Sheet 1.

R. M. HUNTER.
ELECTRIC LOCOMOTIVE.

No. 520,111.   Patented May 22, 1894.

Attest
Inventor (No Model.) 2 Sheets—Sheet 2.

R. M. HUNTER.
ELECTRIC LOCOMOTIVE.

No. 520,111. Patented May 22, 1894.

Attest
Inventor

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRIC LOCOMOTIVE.

SPECIFICATION forming part of Letters Patent No. 520,111, dated May 22, 1894.

Application filed April 25, 1893. Serial No. 471,743. (No model.)

*To all whom it may concern:*

Be it known that I, RUDOLPH M. HUNTER, of the city and county of Philadelphia and State of Pennsylvania, have invented an Improvement in Electrical Vehicles, of which the following is a specification.

My invention relates to electric vehicles, and consists of certain improvements which are fully set forth in the following specification and shown in the accompanying drawings which form a part thereof.

This application, Case No. 250, has particular reference to that class of electrically propelled vehicles which might be termed electric locomotives or those more particularly designed for traction purposes in cases where a series of cars or trailers are pulled after the electrically propelled vehicle.

In carrying out my invention I provide the axle which carries the large drive wheels with an electric motor directly journaled thereon and preferably adapted to rotate the axle without the intervention of gearing or other variable or speed reducing transmitting connections. The motor thus transmits its weight directly upon the driving wheels, and is prevented from rotating by an arm extending forward and pivoted to the bogie or truck at the forward part of the locomotive. The locomotive has bearings upon two distantly located points upon the driving axle but is centered wholly upon the pivot at the truck at its forward part, and the spring connection between the frame of the locomotive and the truck is preferably in line with the pivot thereof. Furthermore, the arm extending from the motor is supported between springs so as to be more or less flexible. The motor may be regulated in any suitable manner, but preferably by varying a counter electro motive force in the motor circuit to oppose the initial electro motive force of the source of electric supply. This may be accomplished in several ways, one of which is herein illustrated but is specifically claimed in my application (Case No. 249) Serial No. 469,709, filed April 10, 1893.

My invention will be better understood by reference to the accompanying drawings, in which—

Figure 1:
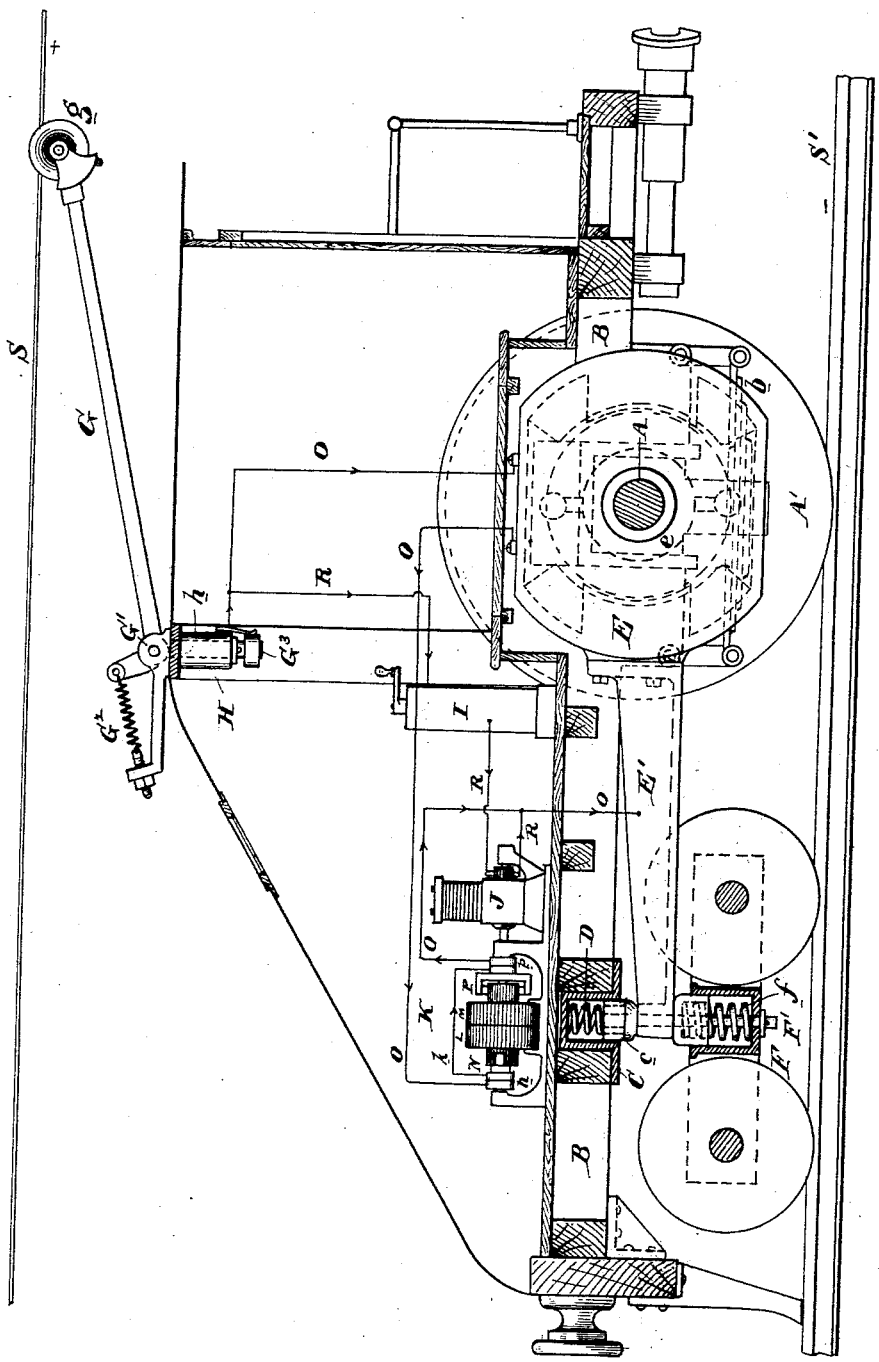
Figure 2:
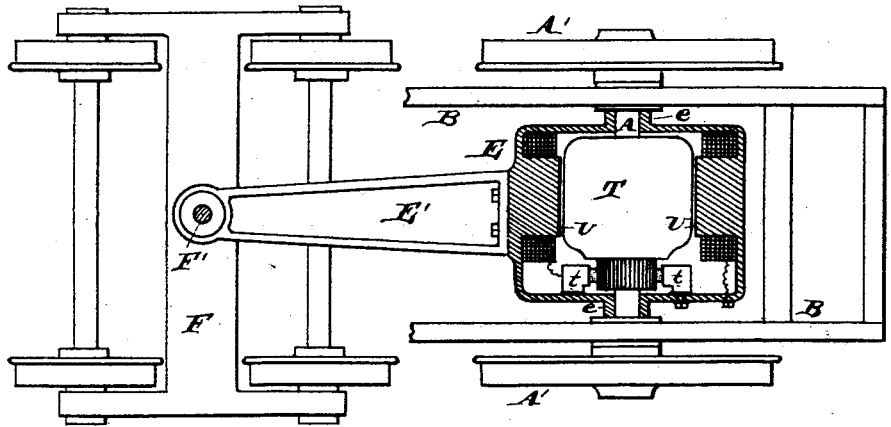
Figure 3:
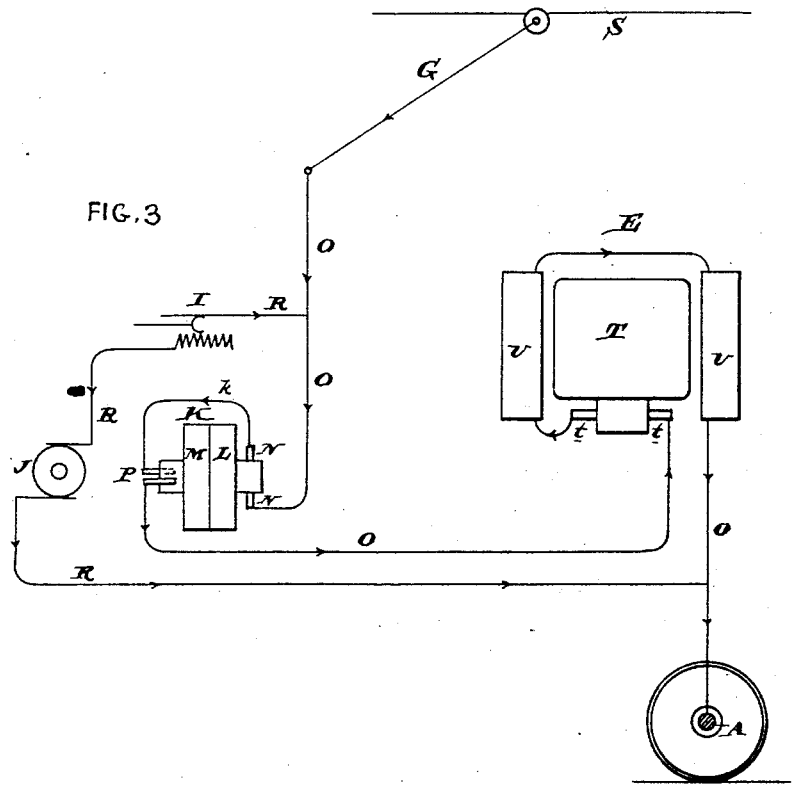

Figure 1 is a sectional elevation of an electric locomotive embodying my invention. Fig. 2 is a sectional plan view of same; and Fig. 3 is a diagrammatic view illustrating the electric circuits.

A is the driving axle and is provided with two large driving wheels A'.

B is the electric locomotive frame or car body and is supported upon the axle A in any suitable manner preferably through the interposition of bearings and springs b. The spring support on the main axle A for the main frame B is thus seen to be similar to the support of the boiler upon the rear axles of a steam locomotive. The axle A is journaled in bearings which hold at their lower parts the leaf springs b, the free ends of which are connected to the main frame B by links, and thus support said main frame elastically upon the axle A. The journals of the frame B upon the driving axle A are arranged at a distance apart so as to make the frame B stable. The forward part of the frame is pivoted directly upon the pivot of the truck F. In this manner it will be seen that the frame B has three points of support, and while being stable it permits the truck F to move freely under it. The truck F may be made in any suitable manner and is preferably provided at its center with a recess in which a spring $f$ is placed. The arm E' of the electric motor E rests upon the said spring $f$ and is centered thereon by the pivot or king bolt F'. Resting above the arm E' and upon the same pin or king bolt is a pivot $c$ which is received within the pivot plate C directly secured to the forward part of the main frame B. A spring D is arranged within the pivot plate C and interposed between it and the pivot $c$ to receive the weight of the forward part of the main frame B'.

The main weight of the motor E is supported by the driving axle A and thus assists in creating the necessary friction between the wheels A' and the rails S'. The armature T of the motor as shown is directly secured to the axle. The field magnets U are inclosed within a metallic casing which is journaled upon the axle at $e$ at widely separated points. The inclosing frame of the motor carries the brushes $t$ for the commutator in any suitable manner. It will thus be seen that while the motor is centered upon the driving axle, the forward part of the arm E' thereof will be sustained between the springs D and $f$ thereby permitting the motor to run easily. The main weight of the frame B is directly supported upon the driving axle A and from the peculiarity of the construction herein set out it will also be observed that the torque of the motor in propelling the locomotive forward will tend to raise the arm E' and thereby reduce the weight upon the truck F. This tendency to lift the forward part of the frame B increases the weight carried upon the rear axle, and thus materially increases the frictional contact between the driving wheels A and rails S'.

The general frame work of the locomotive is immaterial and may be greatly modified to suit the ideas of the designer, though it is preferable to bevel the forward part as indicated to reduce the frictional contact with the air, particularly in those locomotives designed for high speed.

S represents the suspended conductor which extends along and parallel to the railway. The suspended conductor would supply positive current, while the rails and earth act as the return. The locomotive is provided with suitable frame H carrying a socket piece $h$ in which is a vertical pivot $G^3$ carrying the frame G. To this frame G' is pivoted upon a transverse axis $a$ trolley arm G which extends rearwardly and is provided at its free end with a grooved collector wheel $g$ adapted to make contact with the suspended conductor S. A spring $G^2$ may be employed to hold the trolley arm upward with an elastic pressure. It is immaterial to my invention what the particular construction of the current collecting device may be as any of the constructions heretofore used in the art may be employed.

The current from the collector passes through the motor circuit O to the frame E' and thence to the rails or return. The motor circuit includes the electric motor E in series with the regulator K. The regulator K is designed to produce an electro motive force which independently of the counter electro motive force of the motor or in conjunction with it, is employed to oppose the initial electro motive force of the line to vary to the desired degree the current passing through the electric motor E, thereby permitting it to operate at a slow speed with the proper efficiency and without danger of being burned out. The electric motor is preferably a series wound machine as is clearly indicated in Fig. 3, and while it is shown as having but two field poles it is evident that it may be provided with a series of poles, though more than two poles is not necessary with the slow speed machine when controlled in the manner herein described. The regulator K consists essentially of a magnetic frame provided with two sets of coils L and M similar in construction to two Gramme rings and each of these is provided with a commutator. Independent brushes N and P are employed respectively for the two commutators and are arranged at an angle to each other (preferably at right angles) and are revolved by the same shaft, which may be driven by a small electric motor J of any suitable construction. Collector rings $n$ and P are employed in connection with respective brushes for completing the circuits. The current will enter from the motor circuit O, through the rings $n$, brush N, induction coils L, thence by circuit $k$, rings $p$ and brushes P through the induction coils M, and thence through the motor circuit to the ground or return. The small regulating motor J is arranged in a shunt circuit R around the large motor E and is provided with a regulator or resistance changer I controlled by hand to vary its speed. By varying the speed of the motor J an electro motive force of any desired degree may be set up by the regulator K and be made to oppose the electric motive force of the line, thus choking off to any desired degree current which is delivered to the motor E when the same is at rest or when running at any speed. Of course it is evident that as the motor E obtains its speed it generates within itself a counter electro motive force which operates in connection with the electro motive force of the regulator K, and will in a large measure during the running operation assist the regulator K in opposing the line current. After the motor E has obtained its maximum speed the regulating motor J may be slowed down, and if the speed of the motor E is sufficiently high it may be possible to allow the motor J to come to rest. Where the runs are of long duration and at a fixed high speed, the regulator K might only be used in stopping or starting the train, and be cut out altogether when a maximum speed is obtained. This regulator is clearly set out in my application to which I have before referred, and therefore in this application I do not claim the said regulator. It forms subject matter of and is claimed in my aforesaid application. This regulator is described in this application simply to illustrate a good practical method of controlling the speed of a large motor, but the invention herein claimed may be employed with any other suitable regulator.

The electric current may be delivered to the car in any suitable manner, as my invention is not confined to any special source of electric energy or means of supplying energy to the motor.

I do not confine myself to the mere details of construction as they may be modified in various ways without departing from the principles of my invention.

What I claim as new, and desire to secure by Letters Patent, is—

1. In an electric locomotive, the combination of a driving axle, an electric motor journaled thereon and having its weight supported thereby, a pivoted truck in advance of the driving axle, and a central pivot support between the truck and the electric motor.

2. In an electric locomotive, the combination of a driving axle, an electric motor journaled thereon and having its weight supported thereby, a pivoted truck in advance of the driving axle, a central pivot support between the truck and the electric motor, and a spring connection between the electric motor and pivoted truck.

3. In an electric locomotive, the combination of a driving axle, an electric motor journaled thereon and having its weight supported thereby, a pivoted truck in advance of the driving axle, a central pivot support between the truck and the electric motor, and a main frame or car body journaled upon the driving axle and pivoted to the truck in line with the pivot connection of the motor.

4. In an electric locomotive, the combination of a driving axle, an electric motor journaled thereon and having its weight supported thereby, a pivoted truck in advance of the driving axle, a central pivot support between the truck and the electric motor, a main frame or car body journaled upon the driving axle and pivoted to the truck in line with the pivot connection of the motor, and springs interposed between the locomotive main frame the driving axle and the truck.

5. In an electric locomotive, the combination of a driving axle, an electric motor journaled thereon and having its weight supported thereby, a pivoted truck in advance of the driving axle, a central pivot support between the truck and the electric motor, a main frame or car body journaled upon the driving axle and pivoted to the truck in line with the pivot connection of the motor, and springs between the electric motor and truck arranged in line with the pivot connection and truck.

6. In an electric locomotive, the combination of the driving axle and wheels, an electric motor supported concentrically with the driving axle and having a revolving portion adapted to rotate the axle directly or without the intervention of gearing, forward wheels and axles, and a pivot connection between a rigid projection from the electric motor and the forward wheels and axles.

7. In an electric locomotive, the combination of the driving axle and wheels, an electric motor supported concentrically with the driving axle and having a revolving portion adapted to rotate the axle directly or without the intervention of gearing, forward wheels and axles, a pivot connection between the electric motor and the forward wheels and axles, and a main frame or car body supported upon the driving axle and also upon the electric motor or an extension thereof.

8. In an electric locomotive, the combination of the driving axle and wheels, an electric motor supported concentrically with the driving axle and having a revolving portion adapted to rotate the axle directly or without the intervention of gearing, forward wheels and axles, a pivot connection between the electric motor and the forward wheels and axles and a main frame or car body spring supported upon the driving axle and also upon the electric motor or an extension thereof.

9. In an electric locomotive, the combination of a driving axle, an electric motor journaled concentrically therein and adapted to directly rotate it and provided with a forward extension which under the operation of the electric motor is adapted to rise, a main frame or body supported upon the driving axle at the rear and at the forward end upon the extension of the electric motor whereby the tendency of the electric motor to revolve as an entirety is utilized in transmitting the weight of the car body upon its axle.

10. In an electric locomotive, the combination of a driving axle, an electric motor journaled concentrically therein and adapted to directly rotate it and provided with a forward extension which under the operation of the electric motor is adapted to rise, a main frame or body supported upon the driving axle at the rear end and at the forward end upon the extension of the electric motor whereby the tendency of the electric motor to revolve as an entirety is utilized in transmitting the weight of the car body upon its axle, and supporting wheels under the forward part of the main frame of the locomotive.

11. In an electric locomotive, the combination of a driving axle, an electric motor journaled concentrically therein and adapted to directly rotate it and provided with a forward extension which under the operation of the electric motor is adapted to rise, a main frame or body supported upon the driving axle at the rear and at the forward end upon the extension of the electric motor whereby the tendency of the electric motor to revolve as an entirety is utilized in transmitting the weight of the car body upon its driving axle, and a spring connection interposed between the forward extension of the electric motor and the main frame.

12. In an electric locomotive, the combination of the driving axle and wheels, an armature secured concentrically with the axle and adapted to directly rotate it, field magnets journaled concentrically with the axle and provided with a longitudinal rigid extension, a truck support for the outer end of the longitudinal extension of the motor, and a main frame supported upon the driving axle and the truck.

In testimony of which invention I have hereunto set my hand.

R. M. HUNTER.

Witnesses:
ERNEST HOWARD HUNTER,
HELEN L. MOTHERWELL.